(12) United States Patent
Foebel et al.

(10) Patent No.: US 10,545,929 B2
(45) Date of Patent: Jan. 28, 2020

(54) METADATA VERSIONING IN A DISTRIBUTED DATABASE

(71) Applicant: SAP SE, Walldorf (DE)

(72) Inventors: Florian Foebel, Buerstadt (DE); Bjoern Friedmann, Rheinmuenster (DE); Boris Gruschko, Heidelberg (DE); Martin Strenge, Berlin (DE); Christian Mohr, Heidelberg (DE)

(73) Assignee: SAP SE, Walldorf (DE)

( * ) Notice: Subject to any disclaimer, the term of this patent is extended or adjusted under 35 U.S.C. 154(b) by 580 days.

(21) Appl. No.: 15/253,750

(22) Filed: Aug. 31, 2016

(65) Prior Publication Data

US 2018/0060373 A1    Mar. 1, 2018

(51) Int. Cl.
*G06F 16/21* (2019.01)
*G06F 16/27* (2019.01)

(52) U.S. Cl.
CPC .......... *G06F 16/213* (2019.01); *G06F 16/275* (2019.01)

(58) Field of Classification Search
CPC ......... G06F 17/30362; G06F 17/30297; G06F 17/30581; G06F 16/24542; G06F 16/24545; G06F 16/2471; G06F 16/213
See application file for complete search history.

(56) References Cited

U.S. PATENT DOCUMENTS

| 7,991,764 | B2 | 8/2011 | Rathod |
| 9,002,813 | B2 | 4/2015 | Gruschko et al. |
| 2003/0202468 | A1 | 10/2003 | Cain et al. |
| 2005/0120105 | A1 | 6/2005 | Popescu et al. |
| 2006/0075134 | A1 | 4/2006 | Aalto et al. |
| 2007/0233835 | A1 | 10/2007 | Kushalnagar et al. |
| 2008/0294648 | A1* | 11/2008 | Lin ..................... G06F 16/2343 |
| 2009/0292802 | A1 | 11/2009 | Popescu et al. |
| 2010/0030734 | A1 | 2/2010 | Chunilal |
| 2010/0281007 | A1* | 11/2010 | Bailor ............... G06F 17/30011 707/704 |
| 2010/0284287 | A1 | 11/2010 | Venuto |
| 2011/0188378 | A1 | 8/2011 | Collins et al. |
| 2011/0228668 | A1* | 9/2011 | Pillai ................... G06F 11/2023 370/217 |
| 2012/0158945 | A1 | 6/2012 | Goldbach et al. |
| 2012/0163384 | A1 | 6/2012 | Takase et al. |
| 2013/0166588 | A1 | 6/2013 | Gruschko et al. |

(Continued)

*Primary Examiner* — David T. Brooks
*Assistant Examiner* — Berhanu Mitiku
(74) *Attorney, Agent, or Firm* — Mintz Levin Cohn Ferris Glovsky and Popeo, P.C.

(57) ABSTRACT

In one respect, there is provided a distributed database system. The distributed database system can include a plurality of nodes and a plurality of optimizers. A first optimizer of the plurality of optimizers can be configured to: receive, from a client, a command; generate, based at least in part on global metadata cached by the first optimizer, an execution plan for fulfilling the command that includes one or more tasks to be performed by at least a first node of the plurality of nodes; determine that at least one task of the one or more tasks are not successfully performed by the first node; and in response to determining that at least one task of the one or more tasks are not successfully performed by the first node, updating the cached global metadata at the first optimizer.

18 Claims, 8 Drawing Sheets

(56) References Cited

U.S. PATENT DOCUMENTS

| | | | |
|---|---|---|---|
| 2014/0137237 A1* | 5/2014 | Robinson | G06F 21/6227 726/21 |
| 2015/0149425 A1 | 5/2015 | Friedmann et al. | |
| 2017/0039137 A1 | 2/2017 | Mukherjee et al. | |
| 2017/0116315 A1 | 4/2017 | Xiong et al. | |
| 2018/0367965 A1 | 12/2018 | Palanisamy et al. | |

* cited by examiner

210 {
/md
/md/locks
/md/locks/A.C opt1

220 {
/md/nodes
/md/nodes/optimizer
/md/nodes/optimizer/opt1
/md/nodes/optimizer/opt1/host lu302021
/md/nodes/executor/ex1
/md/nodes/executor/ex1/host lu256217
/md/nodes/executor/ex2
/md/nodes/executor/ex2/host lu246058

230 {
/md/schemas
/md/schemas/A
/md/schemas/A/tables/B
/md/schemas/A/tables/B/fields
/md/schemas/A/tables/B/fields/ID
/md/schemas/A/tables/B/fields/ID/key true
/md/schemas/A/tables/B/fields/ID/type int
/md/schemas/A/tables/B/fields/Name
/md/schemas/A/tables/B/fields/Name/type varchar
/md/schemas/A/tables/B/fields/Name/dimension 256
/md/schemas/A/tables/B/partitions
/md/schemas/A/tables/B/partitions/ex1
/md/schemas/A/tables/B/partitions/ex2
/md/schemas/A/tables/B/version 2

FIG. 2

METADATA VERSIONING IN A DISTRIBUTED DATABASE

FIELD

The present disclosure generally relates to database processing and, more specifically, to the update of metadata in a distributed database system.

BACKGROUND

Metadata in a database can include definitions that specify the structure and/or organization of data within a database. For example, metadata describing the schema of a relational database can specify how data in the relational database is organized into one or more database tables. Meanwhile, metadata describing database tables can indicate the names, sizes, and the number of rows in each database table in the relational database.

A distributed database can be associated with both global and local metadata. Global metadata can be pertinent to the distributed database as a whole including, for example, metadata describing the organization of data (e.g., into one or more data partitions and tables) across the distributed database. By contrast, local metadata is applicable to individual nodes within the distributed database. For instance, the local metadata associated with a particular node can relate specifically to the structure and/or organization of data stored and/or managed by that node.

SUMMARY

Methods, systems, and articles of manufacture, including computer program products, are provided for metadata versioning. In some implementations of the current subject matter, there is provided a distributed database system. The distributed database system can include a plurality of nodes and a first optimizer. The first optimizer can be configured to: receive, from a client, a command; generate, based at least in part on global metadata cached by the first optimizer, an execution plan for fulfilling the command that includes one or more tasks to be performed by at least a first node of the plurality of nodes; determine that at least one task of the one or more tasks are not successfully performed by the first node; and in response to determining that at least one task of the one or more tasks are not successfully performed by the first node, updating the cached global metadata at the first optimizer.

In some variations, one or more of the features disclosed herein including the following features can optionally be included in any feasible combination. The first optimizer generates the execution plan without verifying that the cached global metadata at the first optimizer is up to date. The first optimizer can be further configured to distribute, to first node, the task and an indicator corresponding to a version number of the global metadata used to generate the task. The first node can be configured to determine, based on the indicator and a version number of local metadata at the first node, whether the task can be successfully performed, and provide, to the first optimizer, an indication corresponding to whether the first optimizer is able to successfully perform the task. The first node may be unable to successfully perform the task, when the local metadata at the first node does not correspond to the cached global metadata at the first optimizer. The local metadata at the first node may not correspond to the cached global metadata at the first optimizer, when the local metadata has been updated in accordance with one or more previous commands to modify global metadata but the cached global metadata at the first optimizer has not been updated in accordance with the one or more previous commands to modify the global metadata. The first optimizer can be further configured to re-execute the command by at least generating, based at least in part on the updated cached global metadata at the first optimizer, an updated execution plan for fulfilling the command.

In some variations, the command can be a data definition language (DDL) command modifying a schema and/or one or more database tables comprising the distributed database, and that modifying the schema and/or one or more database tables can include modifying global metadata associated with the distributed database. The task can include one or more updates to a local metadata at the first node. The first optimizer can be further configured to: create a lock on the global metadata associated with the distributed database; update a global copy of the global metadata associated with the distributed database; and release the lock on the global metadata. The distributed database system can further include a second optimizer. The second optimizer can be configured to: detect the release of the lock on the global metadata; and in response to detecting the release of the lock on the global metadata, updating global metadata cached by the second optimizer by at least synchronizing the cached global metadata at the second optimizer with the global copy of the global metadata.

In some variations, the command can be a data modification language (DML) command, and the task can include operations on data stored at and/or managed by the first node.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example of database metadata consistent with implementations of the current subject matter;

Figure 1:
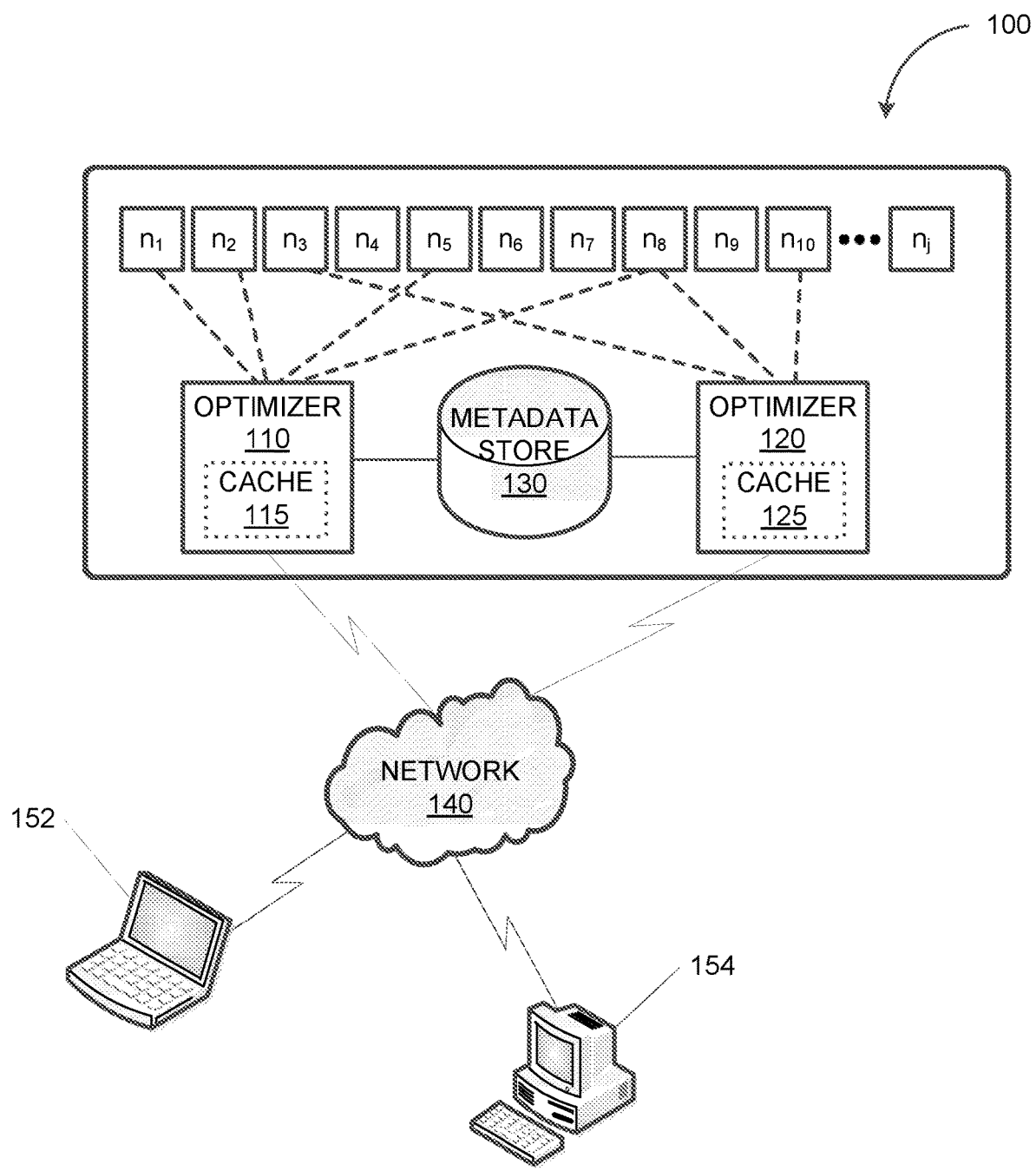
FIG. 1 depicts a network diagram illustrating a distributed database system consistent with implementations of the current subject matter.

Like labels are used to refer to same or similar items in the drawings.

DETAILED DESCRIPTION

A distributed database can include one or more optimizers configured to handle both modifications to the metadata associated with the distributed database and queries on the data stored in the distributed database. As such, each optimizer can maintain a cache of the global metadata. An optimizer can determine, based on its cached copy of the global metadata, tasks to be performed by one or more nodes in order to complete a change to the metadata or a data query. The tasks can be distributed to the relevant nodes, which perform the tasks based on the local metadata associated with the individual nodes.

When one optimizer responds to a change to the structure and/or organization of data (e.g., schema) within the distributed database (e.g., CREATE TABLE, ALTER TABLE, DROP TABLE) by altering the global metadata, that change is propagated to the global metadata cached by the other optimizers. Moreover, the change to the global metadata can require corresponding updates to the local metadata associated with one or more individual nodes. But the distributed database may be required to handle additional metadata changes and data queries (e.g., SELECT, INSERT, UPDATE, DELETE) before earlier changes to the global metadata can be synchronized across the various optimizers in the distributed database. Thus, both previous versions of data and metadata are typically retained in order to fulfill such intervening requests. However, retaining previous versions of data and metadata can increase the operational overhead associated with the distributed database.

As noted above, a distributed database may be required to respond to one or more data queries and/or requests for metadata modifications before previous changes to the global metadata can be propagated to the global metadata cached by individual optimizers in the distributed database. But retaining multiple versions of global metadata in order to respond to intervening data queries and/or metadata modification requests can impose significant operational overhead. Thus, in some implementations of the current subject matter, a distributed database can include optimizers that are configured to execute data queries and/or metadata modifications optimistically. That is, an optimizer can generate an execution plan for a data query or metadata modification without verifying that the optimizer's existing cache of global metadata is up to date (e.g., synchronized with the most recent updates). As such, the distributed database may be able to complete one or more data queries and/or metadata modifications before metadata is fully synchronized across the distributed database system.

In some implementations of the current subject matter, an optimizer can receive one or more commands. For example, the optimizer can receive a data definition language (DDL) command to modify the structure and/or organization of data (e.g., schema) within the distributed database, which requires changes to both the global and local metadata associated with the distribute database. Alternately, the optimizer can receive a data manipulation language (DML) command, which indicates one or more operations (e.g., SELECT, INSERT, UPDATE, DELETE) to be performed on the data stored in the distributed database. According to some implementations of the current subject matter, an optimizer can be configured to generate an execution plan for the command (e.g., DDL command, DML command) based on the global metadata cached by the optimizer. The execution plan can be generated without verifying that the version of the global metadata that is currently cached by the optimizer is up to date (e.g., synchronized with the most recent updates).

In some implementations of the current subject matter, the optimizer can generate an execution plan that includes tasks to be performed by one or more nodes in order to fulfill the command. The optimizer can be further configured to distribute the tasks to the appropriate nodes. The nodes receiving the tasks can perform the tasks based on the local metadata at each node. According to implementations of the current subject matter, the one or more nodes performing the tasks can be configured to provide, to the optimizer, an indication of whether the tasks are performed successfully. The optimizer can be configured to update its cached global metadata when the optimizer receives, from a node, an indication that at least one task was not successfully performed. The optimizer can be further configured to generate, based on the updated cache of global metadata, an updated execution plan and re-execute the command in accordance with the updated execution plan.

In some implementations of the current subject matter, a node can receive, from an optimizer, one or more tasks. The node can attempt to perform the one or more tasks and provide, to the optimizer, an indication of a result and/or outcome of the attempt (e.g., success or failure) to perform the one or more tasks. For example, the local metadata used by the node to perform the tasks may have been subject to one or more recent updates. Meanwhile, the one or more tasks assigned to the node may have been generated using cached global metadata that has not been synchronized with these recent updates. As such, the node may fail to successfully perform the one or more tasks due to this mismatch between global and local metadata. Accordingly, the node can provide an indication of the failure to successfully perform the one or more tasks.

FIG. 1 depicts a network diagram illustrating a distributed database 100 consistent with implementations of the current subject matter. Referring to FIG. 1, the distributed database 100 can include a plurality of optimizers including, for example, a first optimizer 110, a second optimizer 120, and a j number of nodes (e.g., $n_1$ through $n_j$). The distributed database 100 can further include a metadata store 130 configured to store global metadata for the distributed database 100. As shown in FIG. 1, the distributed database 100 can communicate with a plurality of clients including, for example, a first client 152 and a second client 154. The distributed database 100 can communicate with the plurality of clients via a wired and/or wireless network 140, which can be a wide area network (WAN), a local area network (LAN), and/or the Internet.

In some implementations of the current subject matter, the distributed database 100 can receive, from the plurality of clients, one or more commands. For instance, the first client 152 and the second client 154 can each submit various DDL and/or DML commands to the distributed database 100. The commands received at the distributed database system 100 can be handled by different optimizers. For example, the first optimizer 110 (or another optimizer) can be configured to handle a command (e.g., DDL or DML command) received from the first client 152 including by generating an execution plan for fulfilling the command. The execution plan can include tasks that are required to be performed by a plurality of nodes including, for example, the nodes $n_1$, $n_2$, $n_5$, and $n_8$. Accordingly, the first optimizer 110 can distribute the tasks to the nodes $n_1$, $n_2$, $n_5$, and $n_8$ such that each of the nodes $n_1$, $n_2$, $n_5$, and $n_8$ can perform the tasks required to fulfill the command from the first client 152. Similarly, the second optimizer 120 (or another optimizer) can generate an execution plan for a different command (e.g., a DDL or DML command) received from the second client 154. The execution plan generated by the second optimizer 120 can include tasks to be performed by a same or a different plurality of nodes including, for example, the nodes $n_3$, $n_8$, and $n_{10}$.

As shown in FIG. 1, each optimizer can include a cache for storing a copy of the global metadata from the metadata store 130. For example, the first optimizer 110 can include a first cache 115 for storing a copy of the global metadata from the metadata store 130. Meanwhile, the second optimizer 120 can include a second cache 125 for storing another copy of the global metadata from the metadata store 130. In some implementations of the current subject matter, the first optimizer 110 can generate execution plans (e.g., for fulfilling one or more commands from the first client 152) based on the cached copy of the global metadata stored in the first cache 115 while the second optimizer 120 can generate execution plans (e.g., for fulfilling one or more commands from the second client 154) based on the cached copy of the global metadata stored in the second cache 125.

Each of the first optimizer 110 and the second optimizer 120 can be configured to handle commands (e.g., from the first client 152 and/or the second client 154) optimistically. For instance, the first optimizer 110 can receive, from the first client 152, a DDL command that require modifications to both the global metadata associated with the distributed database system 100 and the local metadata associated with one or more nodes (e.g., the nodes $n_1$, $n_2$, $n_5$, and $n_8$). Meanwhile, the second optimizer 120 can receive, from the second client 154, another DDL command or a DML command that operates on data stored at one or more nodes (e.g., the nodes $n_3$, $n_8$, and $n_{10}$). Completing the DDL command from the first client 152 can require updates to the global metadata stored in the metadata store 130 as well as updates to the global metadata cached by both the first optimizer 110 (e.g., in the first cache 115) and the second optimizer 120 (e.g., in the second cache 125). Moreover, completing the DDL command from the first client 152 can require updates to the local metadata at one or more nodes including, for example, the nodes $n_1$, $n_2$, $n_5$, and $n_8$.

According to some implementations of the current subject matter, the second optimizer 120 may receive the DDL or DML command from the second client 154 after the first optimizer 110 has received and executed one or more DDL commands from the first client 152 to modify the metadata associated with the distributed database 100. The second optimizer 120 can generate an execution plan for the DDL or DML command received from the second client 154 without verifying whether the cached copy of the global metadata stored in the second cache 125 is up to date. That is, the second optimizer 120 can generate the execution plan without verifying whether the cached copy of the global metadata stored in the second cache 125 has been updated in accordance with the changes required by the DDL command executed by the first optimizer 110.

In some implementations of the current subject matter, at least some of the j number of nodes (e.g., $n_1$ through $n_j$) included in the distributed database 100 can be required to perform one or more tasks set forth in the execution plan for fulfilling a command (e.g., DDL command, DDL command). For instance, completing a DDL command can require one or more individual nodes to update the respective local metadata. Meanwhile, completing a DML command can require one or more nodes to perform, based on local metadata, operations on the data stored at the individual nodes. According to implementations of the current subject matter, optimizers (e.g., the first optimizer 110, the second optimizer 120) are configured to generate execution plans without verifying the currency of the cached global metadata used to generate the execution plans. As such, the nodes required to perform the tasks may be unable to successfully perform the task due to a mismatch between the local metadata and the cached global metadata used to generate the execution plans.

Returning to the previous example, the execution plan generated by the second optimizer 120 can include tasks to be performed by the nodes $n_3$, $n_8$, and $n_{10}$. The second optimizer 120 may have generated the execution plan prior to updating the cached global metadata (e.g., stored in the second cache 125) in accordance with the changes required by the DDL command executed by the first optimizer 110. Meanwhile, the local metadata at one or more nodes including, for example, the node $n_8$ have already been updated in accordance to the DDL command executed by the first optimizer 110. As such, due to a discrepancy between the global metadata cached by the second optimizer 120 and the local metadata at the node $n_8$, at least the node $n_8$ may be unable to successfully perform the tasks required by the execution plan.

In some implementations of the current subject matter, the nodes $n_3$, $n_8$, and $n_{10}$ can each be configured to provide, to the second optimizer 120, an indication that corresponds to a result and/or outcome of each node's respective attempt to perform the assigned tasks. Thus, the nodes that are unable to successfully perform the tasks required by the execution plan (e.g., the $n_8$) can provide a corresponding indication to the second optimizer 120. In response to one or more indication (e.g., from the node $n_8$) that one or more required tasks cannot be successfully performed, the second optimizer 120 can be configured to update its cached copy of the global metadata (e.g., stored in the second cache 125) including by synchronizing the cached global metadata with the global metadata stored at the metadata store 130. In addition, the second optimizer 120 can be configured to repeat execution of the DDL or DML, command by generating an updated execution plan based on the updated global metadata.

FIG. 2 depicts an example of database metadata consistent with implementations of the current subject matter. As shown in FIG. 2, database metadata can have a hierarchical structure that can be divided into multiple domains including, for example, a locks domain 210, a nodes domain 220, and a schemas domain 230.

The locks domain 210 can include metadata that is used by various optimizers (e.g., the first optimizer 110, the second optimizer 120) to prevent concurrent modifications of the global metadata (e.g., stored in the metadata store 130). For instance, the first optimizer 110 can add a lock (e.g., /md/locks/A.C opt 1) to the locks domain 210 when the first optimizer 110 is modifying the global metadata stored in the metadata store 130. This lock can prevent the second optimizer 120 from making changes to the global metadata at the same time.

The nodes domain 220 can include metadata regarding the various nodes in the distributed database 100. For instance, the nodes domain 220 can include metadata regarding the first optimizer 110, the second optimizer 120, and the nodes $n_1$ through $n_j$. The metadata forming the nodes domain 220 can include, for example, contact information associated with the individual nodes.

The schemas domain 230 can include metadata that describes the organization and/or structure of the data in the distributed database 100. In some implementations of the current subject matter, the metadata forming the schemas domain 230 can follow the paradigm associated with a relational database. As such, the metadata in the schemas domain 230 can include a top level schema, tables, fields (e.g., column), and partitioning information. As shown in FIG. 2, the Schema A can include a Table B. The Table B can include two fields (e.g., columns. The ID column can contain integer type data while the Name column can contain character type data. Meanwhile, data in the ID column can act as the primary key (e.g. index) for the TABLE B. Furthermore, TABLE B can be split into two partitions such that data in Table B is stored at and/or managed by two different nodes (e.g., of the nodes $n_1$ through $n_j$). The version number of the current metadata for Table B is 2.

Figure 3:
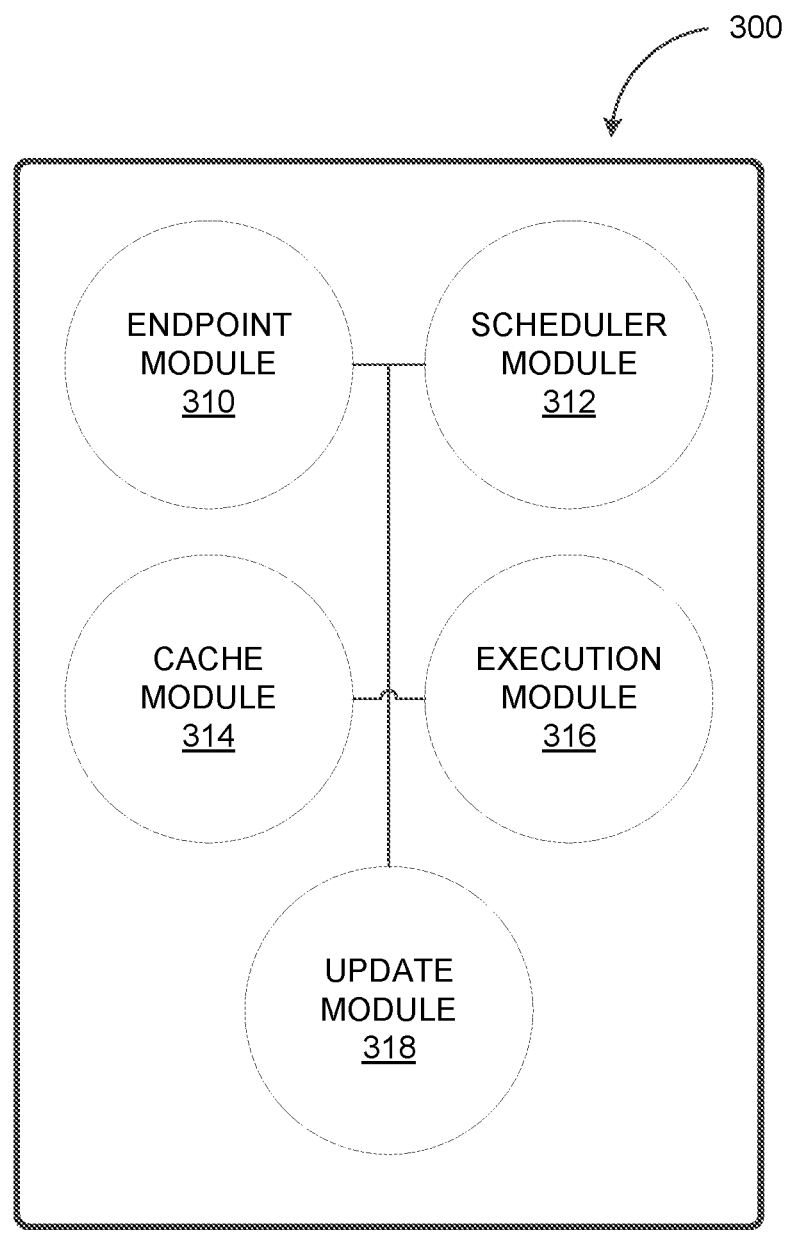
FIG. 3 depicts a block diagram illustrating an optimizer consistent with implementations of the current subject matter.

FIG. 3 depicts a block diagram illustrating an optimizer 300 consistent with implementations of the current subject matter. Referring to FIGS. 1 and 3, the optimizer 300 can include functionalities of the first optimizer 110 and/or the second optimizer 120. As shown in FIG. 3, the optimizer 300 can include an endpoint module 310, a scheduler module 312, a cache module 314, an execution module 316, and an update module 318.

In some implementations of the current subject matter, the endpoint module 310 can be configured to receive various commands from one or more clients including, for example, the first client 152 and the second client 154. For instance, the endpoint module 310 may receive, from the first client 152 and/or the second client 154, one or more DDL and/or DML, commands.

The scheduler module 312 can be configured to generate an execution plan for fulfilling the commands received by the endpoint module 310. For example, the scheduler module 312 can generate, for a DDL or DML command, an execution plan that includes task to be performed by one or more of the nodes $n_1$ through $n_j$ in order to fulfill the commands received by the endpoint module 310. According to implementations of the current subject matter, the scheduler module 312 can generate the execution plan based on a copy of the global metadata cached by the cache module 314. The scheduler 312 can be configured to generate the execution plan without verifying whether the copy of the global metadata cached by the cache module 314 is update to date (e.g., includes the most current updates).

In some implementations of the current subject matter, the execution module 316 can be configured to distribute, in accordance with the execution plan, the tasks to the one or more nodes. Furthermore, the execution module 316 can be configured to determine, based on indications provided by the nodes required to perform the tasks, whether the tasks are performed successfully. In the event that the execution module 314 determines that at least one task was not successfully performed, the execution module 314 can be configured to cause the update module 318 to update the copy of the global metadata cached by the cache module 314. The execution module 314 can be further configured to cause a repeat execution of the command by causing the scheduler module 312 to generate another execution plan for the command based on an updated copy of the global metadata.

In some implementations of the current subject matter, the update module 318 can be further configured to update the global metadata in the metadata store 130 when the optimizer 300 is fulfilling a DDL command that modifies both global and local metadata. Alternately or additionally, the update module 318 can be configured to update the cached copy of the global metadata including by synchronizing the cached copy of the global metadata with the copy of the metadata that is stored by the metadata store 130. For instance, the update module 318 can synchronize the cached copy of the global metadata with the metadata stored at the metadata store 130 when the execution module 316 determines that the cached copy of the global metadata is out of date.

In some implementations of the current subject matter, the update module 318 can be configured to synchronize the cached copy of the global metadata with the metadata stored at the metadata store 130 on a periodic basis. For instance, one or more locks may be created and placed on a portion (e.g., table, partition) of a distributed database in order for metadata modification (e.g., one or more DDL commands) to take place. Such locks are removed when the metadata modification is complete. The update module 318 can be configured to detect the deletion of locks and update the cached copy of the global metadata in response to the deletion of a lock.

Figure 4:
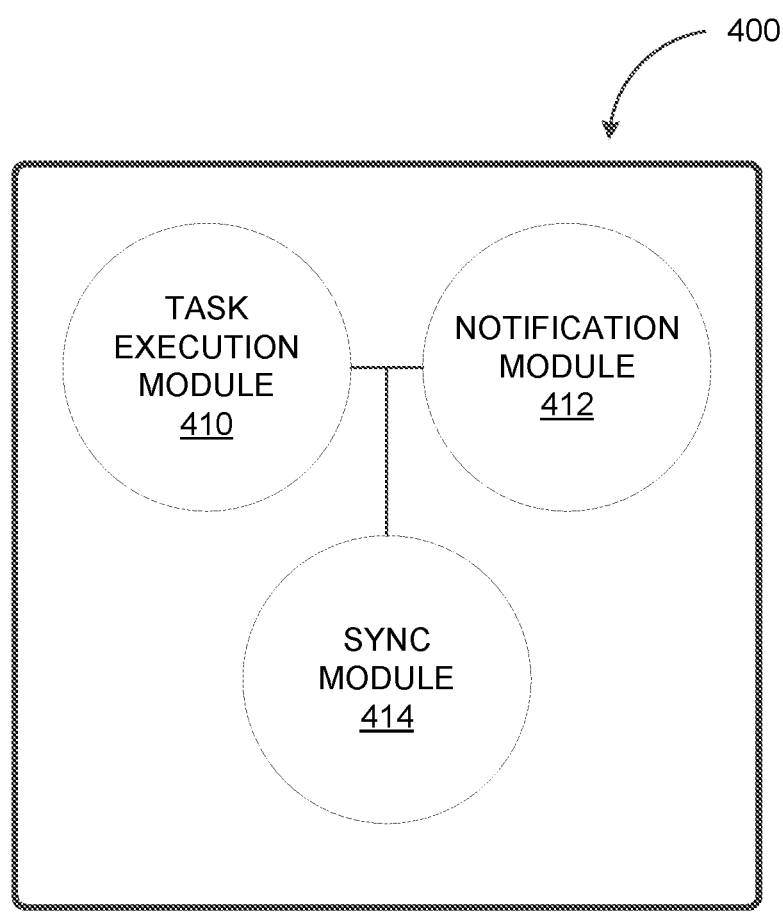
FIG. 4 depicts a block diagram illustrating an executor consistent with implementations of the current subject matter.

FIG. 4 depicts block diagram illustrating a node 400 consistent with implementations of the current subject matter. Referring to FIGS. 1 and 3-4, the node 400 can implement one or more of the nodes $n_1$ through $n_j$. As shown in FIG. 4, the node 400 can include a task execution module 410, a versioning module 412, and a synchronization module 414.

In some implementations of the current subject matter, the task execution module 410 can be configured to perform one or more tasks, which may have been assigned to the node 400 by an optimizer (e.g., the optimizer 300). For instance, the optimizer 300 can generate, based on global metadata cached by the optimizer, an execution plan that requires the node 400 to perform one or more tasks in order to fulfill a DDL command or a DML command. The task execution module 410 can attempt to execute the one or more tasks based on the local metadata at the node 400, which may have been updated in response to one or more previous DDL commands. However, the optimizer 300 can be configured to generate the execution plan without verifying the currency of that cached global metadata. As such, the cached global metadata used to generate execution plan may not have been updated in accordance to the one or more pervious DDL commands. Due to this mismatch between the cached global metadata at the optimizer 300 and the local metadata at the node 400, the node 400 may unable to successfully perform the tasks assigned to the node 400. As such, the task execution module 410 can be configured to provide, to the optimizer 300, an indication of whether the one or more tasks are performed successfully. For example, the notification module 412 can be configured to provide, to the optimizer 300, one or more indications corresponding to a result and/or outcome of the attempts by the node 400 to perform the one or more tasks assigned to the node 400 by the optimizer 300.

In some implementations of the current subject matter, the synchronization module 414 can be configured to update the local metadata at the node 400. For instance, when the tasks assigned to the node 400 includes updating the local metadata in accordance to the changes required by a DDL command, the synchronization module 414 can be configured to update the local metadata including by altering the structure and/or organization of the data stored at and/or managed by the node 400.

Figure 5:
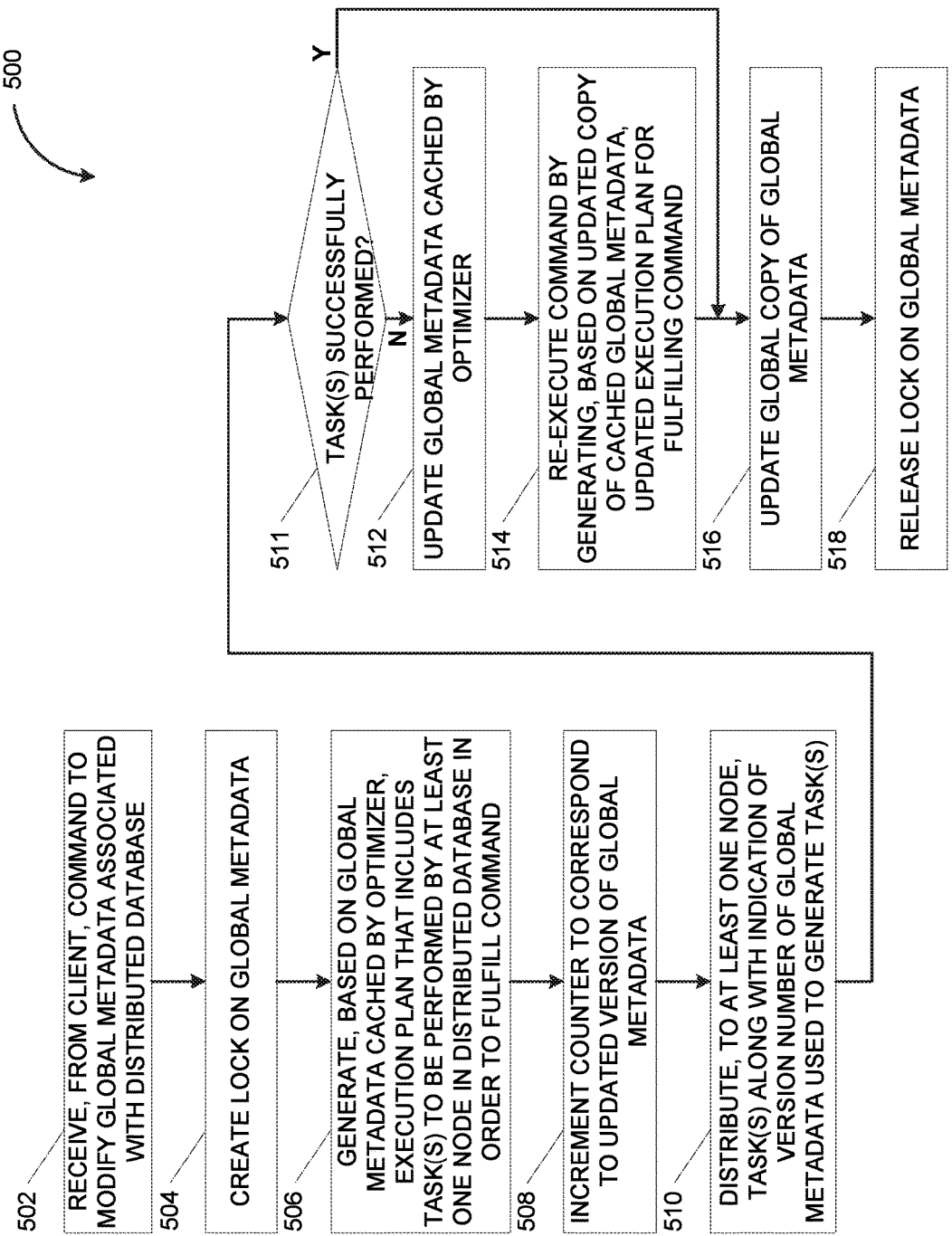
FIG. 5 depicts a flowchart illustrating a process for modifying metadata consistent with implementations of the current subject matter.

FIG. 5 depicts a flowchart illustrating a process 500 for modifying metadata consistent with implementations of the current subject matter. Referring to FIGS. 1 and 2-5, the process 500 can be performed by the optimizer 300, which may implement the first optimizer 110 and/or the second optimizer 120.

An optimizer can receive, from a client, a command to modify the global metadata associated with a distributed database (502). For instance, referring to FIG. 1, the first optimizer 110 can receive, from the first client 152, the following DDL command modifying the structure and/or organization of data in the distributed database 100:

ALTER TABLE A.B. add Email varchar (512)

The optimizer can create a lock on the global metadata (504). For example, the first optimizer 110 can create a lock associated with the first optimizer 110 (e.g., using the name opt 1) with the following statement:

/md/locks/A.B opt 1

The optimizer can generate, based on global metadata cached by the optimizer, an execution plan that includes one or more tasks to be performed by at least one node in the distributed database in order to fulfill the command (506). For example, the first optimizer 110 can generate, based on the cached global metadata stored in the first cache 115, an execution plan that includes tasks to be performed by one or more nodes including, for example, the nodes $n_1$, $n_2$, $n_5$, and $n_8$. According to some implementations of the current subject matter, the first optimizer 110 generates the execution plan without verifying whether the cached global metadata is up to date. Instead, the first optimizer 110 can generate the execution plan based on a version of the global metadata that is currently cached at the first optimizer 110 (e.g., by the cache module 314). For instance, the second optimizer 120 may have executed a previous DDL command (e.g., from the second client 154) modifying the global metadata prior to the first optimizer 110 receiving and executing the DDL command from the first client 152. Nevertheless, the first optimizer 110 can generate the execution plan without ensuring that the updates required by the earlier DDL command have been propagated to the copy of the global metadata cached by the first optimizer 110 (e.g., in the first cache 115).

The optimizer can increment a counter to correspond to an updated version of the global metadata (508). In some implementations of the current subject matter, each optimizer can be configured to track new versions (e.g., current version number) of the global metadata. Thus, returning to earlier example, the first optimizer 110 can respond to the DDL command by incrementing a counter (e.g., from 2 to 3) to correspond to an updated version of the global metadata (e.g., stored at the metadata store 130).

The optimizer can distribute the one or more tasks to the at least one node in the distributed database along with an indication of the version number of the global metadata that is used to generate the tasks (510). For instance, the first optimizer 110 can generate the tasks based on the version of the global metadata that is currently cached at the first optimizer 110 (e.g., version 2). Thus, the first optimizer 110 can distribute, to the nodes $n_1$, $n_2$, $n_5$, and $n_8$, the one or more tasks along with an indication that version 2 of the global metadata was used to generate the tasks.

The optimizer can determine whether the one or more tasks are successfully performed by the at least one node (511). For example, the first optimizer 110 can distribute the tasks to the nodes $n_1$, $n_2$, $n_5$, and $n_8$. Each of the nodes $n_1$, $n_2$, $n_5$, and $n_8$ can determine whether the respective tasks assigned to the nodes can be performed successfully. The nodes can further provide, to the first optimizer 110, indications corresponding to whether the nodes are able to successfully perform the tasks. As such, in the event that a discrepancy between the cached global metadata at the first optimizer 110 and the local metadata at one or more of the nodes $n_1$, $n_2$, $n_5$, and $n_8$ prevents a successful performance of a task, the first optimizer 110 may receive one or more indications of the failure to successfully perform the task.

If the optimizer determines that the one or more tasks are not successfully performed by the at least one node (511-N), the optimizer can update the global metadata cached by the optimizer (512). The optimizer can further re-execute the command by generating, based on an updated copy of the cached global metadata, an updated execution plan for fulfilling the command (514). Upon a successful re-executing the command, the optimizer can update a global copy of the global metadata (516). The optimizer can further delete the lock on the global metadata (518).

For instance, in the event that the first optimizer 110 receives, from at least one of the nodes $n_1$, $n_2$, $n_5$, and $n_8$, an indication that one or more tasks required by the execution plan cannot be performed successfully, the first optimizer 110 can be configured to update the cached copy of the global metadata (e.g., stored in the first cache 115). The first optimizer 110 can update the cached global metadata by synchronizing the cached global metadata with a global copy of the global metadata stored in the metadata store 130. The first optimizer 110 can re-execute the command by generating, based on the updated copy of the cached global metadata, an updated execution plan that includes tasks to be performed by one or more nodes in the distributed database 100. Once the command has been executed, the first optimizer 110 can update the global metadata stored in the metadata store 130, which includes incrementing the version number (e.g., included in the schemas domain 230) of the global metadata at the metadata store 130. The first optimizer 110 can then release the lock placed on the global metadata at operation 504. For example, the first optimizer 110 can update the global metadata stored in the metadata store 130 with the following statements:

SET/md/schemas/A/tables/B/version 3
CREATE/md/schemas/A/tables/B/fields/Email
* . . . /Email/type varchar
* . . . /Email/dimension 512

Alternately, if the optimizer determines that the one or more tasks are successfully performed (511-Y), the optimizer can update a global copy of the global metadata (516). The optimizer can delete the lock on the global metadata (518). For example, if the first optimizer 110 receives, from the nodes $n_1$, $n_2$, $n_5$, and $n_8$, that the one or more tasks are all successfully performed, the first optimizer 110 can then update the global metadata stored in the metadata store 130 and then release the lock placed on the global metadata at operation 504.

Figure 6:
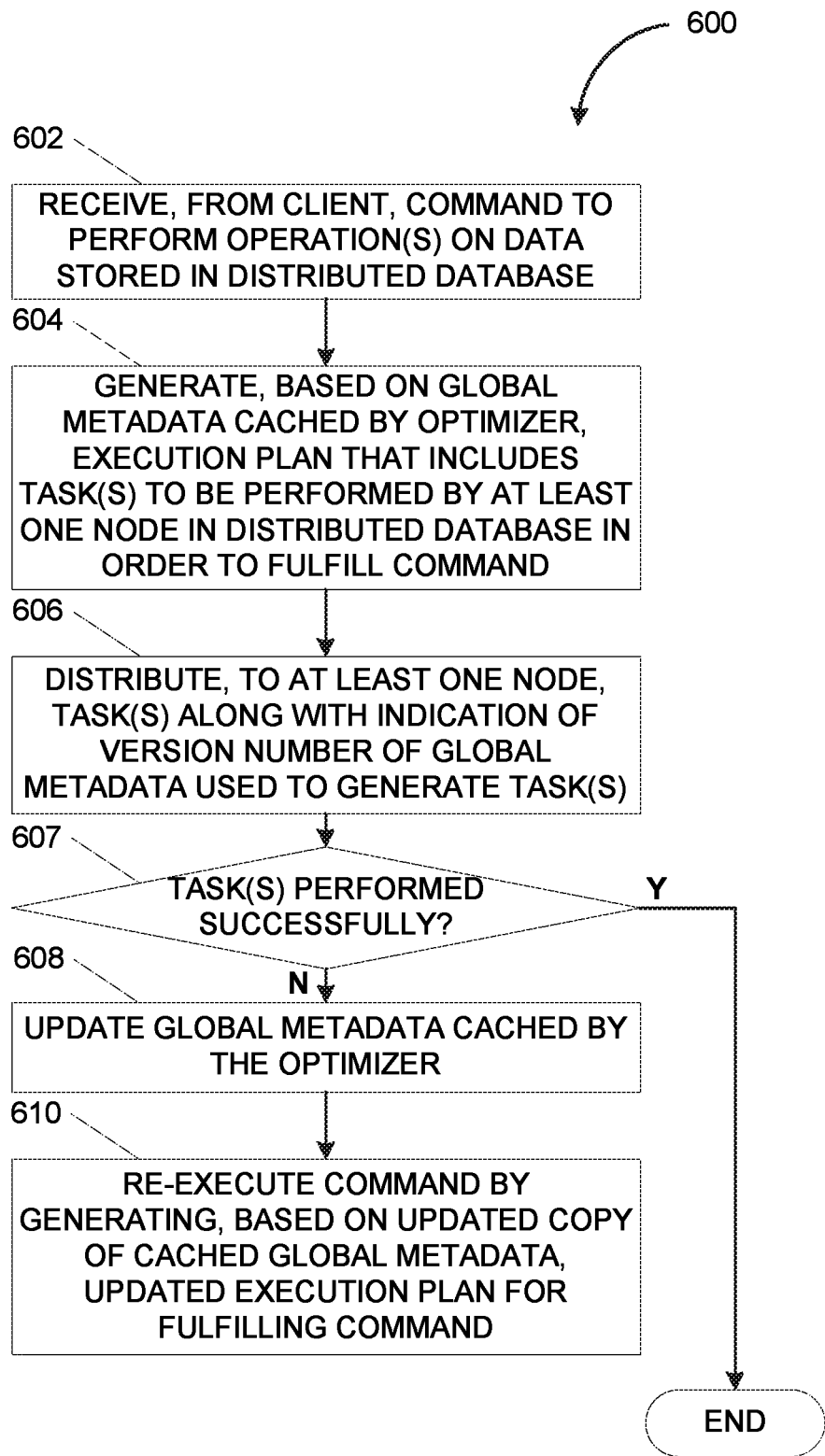
FIG. 6 depicts a flowchart illustrating a process for executing a query consistent with implementations of the current subject matter.

FIG. 6 depicts a flowchart illustrating a process 600 for executing a query consistent with implementations of the current subject matter. Referring to FIGS. 1 and 2-6, the process 600 can be performed by the optimizer 300, which may implement the first optimizer 110 and/or the second optimizer 120.

An optimizer can receive, from a client, a command to perform one or more operations on the data stored in a distributed database (602). For example, the second optimizer 120 can receive, from the second client 154, a DML command that operates on the data stored in the distributed database 100 including, for example, a SELECT command, an INSERT command, an UPDATE command, and a DELETE command.

The optimizer can generate, based on a cached copy of the global metadata associated with the distributed database, an execution plan that includes one or more tasks to be performed by at least one node in the distributed database in order to fulfill the command (604). For example, the second optimizer 120 can generate, based on the cached global metadata stored in the second cache 125, an execution plan that includes tasks to be performed by one or more nodes including, for example, the nodes $n_3$, $n_8$, and $n_{10}$. According to some implementations of the current subject matter, the second optimizer 120 generates the execution plan without verifying whether the cached global metadata is up to date. For instance, the first optimizer 110 may have executed a DDL command (e.g., from the first client 152) modifying the global metadata prior to the second optimizer 120 receiving and executing the DDL command from the second client 154. Nevertheless, the second optimizer 120 can generate the execution plan without ensuring that the updates required by the earlier DDL command have been propagated to the copy of the global metadata cached by the second optimizer 120 (e.g., in the second cache 125).

The optimizer can distribute the one or more tasks to the at least one node in the distributed database along with an indication of the version number of the global metadata that is used to generate the tasks (606). For instance, the second optimizer 120 can generate the tasks required for fulfilling the DML command based on the version of the global metadata that is currently cached at the first optimizer 110 (e.g., version 2). Thus, the second optimizer 120 can distribute, to the nodes $n_3$, $n_8$, and $n_{10}$, the one or more tasks along with an indication that version 2 of the global metadata was used to generate the tasks.

The optimizer can determine whether the one or more tasks are successfully performed by the at least one node (607). For example, the second optimizer 120 can distribute the tasks to the nodes $n_3$, $n_8$, and $n_{10}$. Each of the nodes $n_3$, $n_8$, and $n_{10}$ can determine whether the nodes are able to successfully perform the tasks assigned to each node. The nodes can further provide, to the second optimizer 120, indications corresponding to whether the nodes are able to successfully perform the tasks. Thus, in the event that a discrepancy between the cached global metadata at the second optimizer 120 and the local metadata at one or more of the nodes $n_3$, $n_8$, and $n_{10}$ prevents a successful performance of a task, the second optimizer 120 may receive one or more indications of a failure to successfully perform the task.

If the optimizer determines that the one or more tasks are not successfully performed by the at least one node (607-N), the optimizer can update the cached copy of the global metadata (608). The optimizer can further re-execute the command by generating, based on an updated copy of the cached global metadata, an updated execution plan for fulfilling the command (610). For instance, in the event that the second optimizer 120 receives, from at least one of the nodes $n_3$, $n_8$, and $n_{10}$, an indication that one or more tasks required by the execution plan cannot be performed successfully, the second optimizer 120 can be configured to update the cached copy of the global metadata (e.g., stored in the second cache 125). The second optimizer 120 can update the cached global metadata by synchronizing the cached global metadata with a global copy of the global metadata stored in the metadata store 130. The second optimizer 120 can re-execute the command by generating, based on the updated copy of the cached global metadata, an updated execution plan that includes tasks to be performed by one or more nodes in the distributed database 100.

Alternately, if the optimizer determines that the one or more tasks are successfully performed (607-Y), the process 600 can terminate.

Figure 7:
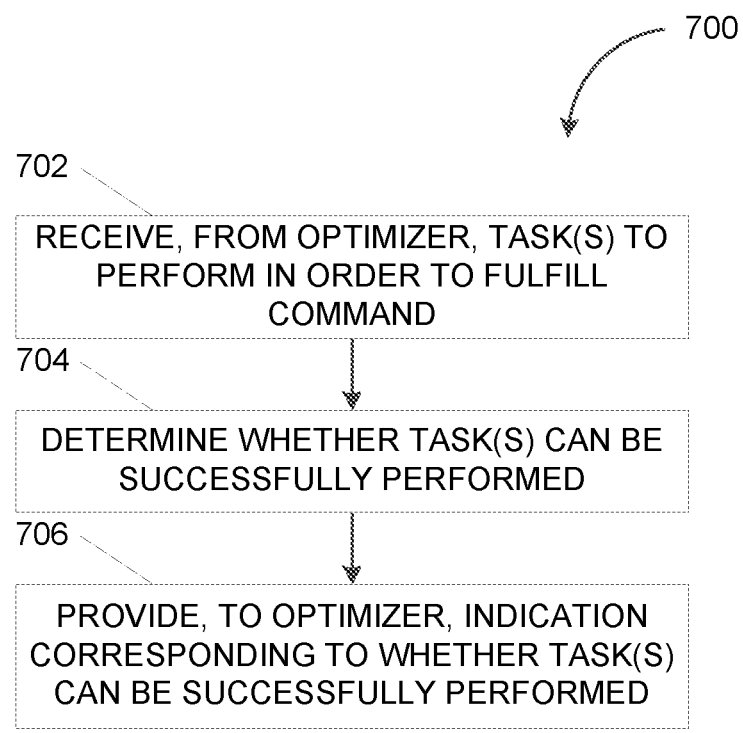
FIG. 7 depicts a flowchart illustrating a process for performing one or more tasks consistent with implementations of the current subject matter.

FIG. 7 depicts a flowchart illustrating a process 700 for performing one or more tasks consistent with implementations of the current subject matter. Referring to FIGS. 1 and 2-7, the process 700 can be performed by the node 400, which may implement one or more of the nodes $n_1$ through $n_j$.

A node can receive, from an optimizer, one or more tasks to perform in order to fulfill a command (702). For example, the node $n_8$ (or a different node) can receive, from the first optimizer 110, one or more tasks to fulfill a DDL command modifying the global metadata associated with the distributed database 100. The one or more tasks to fulfill the DDL command can include updates to the local metadata at the node $n_8$. Alternately or additionally, the node $n_8$ can receive, from the second optimizer 120, one or more tasks to fulfill a DML, command. The one or more tasks to fulfill the DML command can include operations on data stored at and/or managed by the node $n_8$.

The node can determine whether the one or more tasks can be successfully performed (704). For instance, the first optimizer 110 can generate, based on a copy of the global metadata cached by the first optimizer 110 (e.g., stored in the first cache 115), an execution plan for fulfilling the DDL command that includes one or more tasks and distribute the task to one or more nodes including, for example, the node $n_8$. Similarly, the second optimizer 120 can generate, based on a copy of the global metadata cached by the second optimizer 120 (e.g., stored in the second cache 125), an execution plan for the DML command that includes one or more tasks and distribute the tasks to one or more nodes including, for example, the node $n_8$. The node $n_8$ can attempt the perform the tasks from the first optimizer 110 and/or the second optimizer 120 based on the local metadata at the node $n_8$ In some implementations of the current subject matter, the cached copy of the global metadata used to generate the tasks may not match the local metadata at the node required to perform the tasks because optimizers are configured to generate the tasks without verifying the currency of cached global metadata. For instance, the first optimizer 110 (or another optimizer) can execute a DDL command modifying a global copy of the global metadata stored at the metadata store 130 and the local metadata at one or more nodes including, for example, the node $n_8$. However, the first optimizer 110 may execute the DDL command without synchronizing the cached global metadata at the first optimizer 110. Thus, the cached global metadata at the first optimizer 110 is not consistent with the local metadata at one or more nodes including, for example, the node $n_8$. By contrast, the second optimizer 120 may have synchronized the cached global metadata at the second optimizer 120 in response to detecting the deletion of the lock used by the first optimizer 110 during the modification of the global metadata. As such, the cached global metadata at the second optimizer 120 may be consistent with the local metadata at one or more nodes including, for example, the node $n_8$.

Because the tasks generated by the second optimizer 120 are based on a current version of the global metadata that is consistent with the local metadata at node $n_8$, the node $n_8$ can successfully perform the tasks from the second optimizer 120. By contrast, the node $n_8$ may be unable to successfully perform the tasks from the first optimizer 110 (e.g., associated with the DDL command) due to the mismatch between the cached global metadata at the first optimizer 110 and the local metadata at the node $n_8$.

According to implementations of the current subject matter, the node $n_8$ can receive, along with the tasks, an indication of the version of the global metadata that was used to generate the tasks. Thus, the node $n_8$ can determine whether the tasks (e.g., from the first optimizer 110 and/or the second optimizer 120) can be performed by comparing the version number of the local metadata at the node $n_8$ with the indicator received along with the tasks. When there is a discrepancy between the version number of the local metadata at the node $n_8$ and the indicator received along with the tasks, the node $n_8$ can determine that the node $n_8$ cannot successfully perform the corresponding tasks. For example, the node $n_8$ can determine that one or more tasks cannot be successfully performed if the version number of the local metadata at the node $n_8$ is 3 but the one or more tasks were generated (e.g., by the first optimizer 110) based on version 2 of the global metadata.

Alternately, the node $n_8$ can attempt to perform the one or more tasks received from the first optimizer 110 and/or the second optimizer 120. Here, the node $n_8$ may be unable to successfully perform the tasks from the first optimizer 110 because the tasks were generated using a different (e.g., outdated) version of the global metadata. By contrast, the node $n_8$ may successfully perform the tasks from the second optimizer 120 because these tasks were generated using a current version of the global metadata, which match the local metadata at the node $n_8$.

The node can provide, to the optimizer, an indication corresponding to whether the node is able to successfully perform the one or more tasks (706). For instance, the node $n_8$ can transmit, to the second optimizer 120, an indication that the node $n_8$ was able to successfully perform the tasks associated with the DML, command. By contrast, the node $n_8$ can transmit, to the first optimizer 110, an indication that the node $n_8$ was not able to successfully perform the tasks associated with the DDL command. According to some implementations of the current subject matter, the indication that the node $n_8$ cannot successfully perform the one or more tasks can cause the first optimizer 110 to update the cached global metadata at the first optimizer 110. The first optimizer 110 can further re-execute the DDL command including by generating, based on the updated copy of the cached global metadata, an updated execution plan for fulfilling the DDL command.

Figure 8:
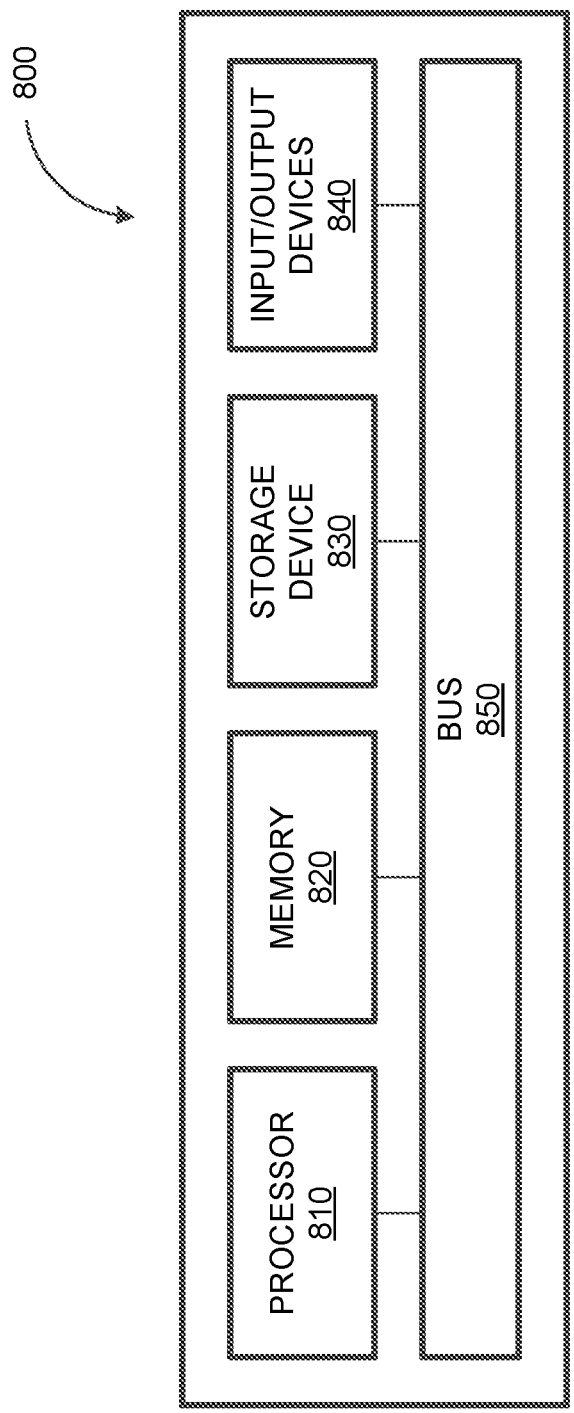
FIG. 8 depicts a block diagram illustrating a computing system consistent with implementations of the current subject matter.

FIG. 8 depicts a block diagram illustrating a computing system 800 consistent with implementations of the current subject matter. Referring to FIGS. 1-8, the computing system 800 can be used to implement the optimizer 300 and/or the node 400.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of the optimizer 300 and/or the node 400, for example. In some implementations of the current subject matter, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some implementations of the current subject matter, the input/output device 840 includes a keyboard and/or pointing device. In various implementations, the input/output device 840 includes a display unit for displaying graphical user interfaces.

According to some implementations of the current subject matter, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   receiving, at a first optimizer, a command on a distributed database system including the first optimizer and a plurality of nodes;
   generating, by the first optimizer, an execution plan for fulfilling the command, wherein the execution plan includes a task to be performed by a first node of the plurality of nodes, wherein the execution plan is generated based at least on global metadata cached at the first optimizer, and wherein the execution plan is generated optimistically without the first optimizer verifying that the global metadata cached at the first optimizer as having been synchronized with a global copy of a global metadata associated with the distributed database to include a most recent update to the global metadata associated with the distributed database system;
   determining, by the first optimizer, that the first node is unable to successfully perform the task based on the execution plan generated using the global metadata cached at the first optimizer; and
   in response to determining that the task is not successfully performed by the first node, updating the global metadata cached at the first optimizer by at least synchronizing the global metadata cached at the first optimizer with the global copy of the global metadata associated with the distributed database system.

2. The system of claim 1, further comprising:
   distributing, to the first node, the task and an indicator corresponding to a version number of the global metadata used to generate the execution plan including the task; and
   receiving, from the first node, an indication corresponding to whether the first node is able to successfully perform the task, wherein the indication is generated by the first node based at least on the indicator from the first optimizer and a version number of local metadata at the first node.

3. The system of claim 2, wherein the first node is unable to successfully perform the task, when the local metadata at the first node does not match the global metadata cached at the first optimizer.

4. The system of claim 3, wherein the local metadata at the first node does not match the global metadata cached at the first optimizer, when the local metadata at the first node comprises a more recent version of the global metadata than the global metadata cached at the first optimizer.

5. The system of claim 1, further comprising:
   re-executing the command by at least generating, based at least in part on the updated global metadata at the first optimizer, another execution plan for fulfilling the command.

6. The system of claim 1, wherein the command comprises a data definition language (DDL) command modifying a schema and/or one or more database tables comprising the distributed database, and wherein modifying the schema and/or one or more database tables includes modifying the global metadata associated with the distributed database system.

7. The system of claim 6, wherein the task includes one or more updates to a local metadata at the first node.

8. The system of claim 6, further comprising:
creating a lock on the global metadata associated with the distributed database system;
updating the global copy of the global metadata associated with the distributed database system; and
releasing the lock on the global metadata upon updating the global copy of the global metadata associated with the distributed database system.

9. The system of claim 8,
wherein a second optimizer in the distributed database system is configured to respond to the release of the lock on the global metadata at least by updating global metadata cached by the second optimizer, and wherein the updating of the global metadata cached by the second optimizer includes synchronizing the global metadata cached at the second optimizer with the global copy of the global metadata.

10. The system of claim 1, wherein the command comprises a data modification language (DML) command, and wherein the task includes one or more operations on data stored at and/or managed by the first node.

11. A method, comprising:
receiving, at a first optimizer, a command on a distributed database system including the first optimizer and a plurality of nodes;
generating, by the first optimizer, an execution plan for fulfilling the command, wherein the execution plan includes a task to be performed by a first node of the plurality of nodes, wherein the execution plan is generated based at least on global metadata cached at the first optimizer, and wherein the execution plan is generated optimistically without the first optimizer verifying that the global metadata cached at the first optimizer as having been synchronized with a global copy of a global metadata associated with the distributed database to include a most recent update to the global metadata associated with the distributed database system;
determining, by the first optimizer, that the first node is unable to successfully perform the task based on the execution plan generated using the global metadata cached at the first optimizer; and
in response to determining that the task is not successfully performed by the first node, updating the global metadata cached at the first optimizer by at least synchronizing the global metadata cached at the first optimizer with the global copy of the global metadata associated with the distributed database system.

12. The method of claim 11, further comprising:
distributing, to the first node, the task and an indicator corresponding to a version number of the global metadata used to generate the execution plan including the task; and
receiving, from the first node, an indication corresponding to whether the first node is able to successfully perform the task, wherein the indication is generated by the first node based at least on the indicator and a version number of local metadata at the first node.

13. The method of claim 12, wherein the first node is unable to successfully perform the task, when the local metadata at the first node does not match the global metadata cached at the first optimizer.

14. The method of claim 11, further comprising:
re-execute, by the first optimizer, the command by at least generating, based at least in part on the updated global metadata at the first optimizer, another execution plan for fulfilling the command.

15. The method of claim 11, wherein the command comprises a data definition language (DDL) command modifying a schema and/or one or more database tables comprising the distributed database, and wherein modifying the schema and/or one or more database tables includes modifying the global metadata associated with the distributed database system.

16. The method of claim 15, further comprising:
creating a lock on the global metadata associated with the distributed database system;
updating the global copy of the global metadata associated with the distributed database system; and
releasing the lock on the global metadata upon updating the global copy of the global metadata associated with the distributed database system.

17. The method 17, wherein a second optimizer in the distributed database system is configured to respond to the release of the lock on the global metadata at least by updating global metadata cached by the second optimizer, and wherein the updating of the global metadata cached by the second optimizer includes synchronizing the global metadata cached at the second optimizer with the global copy of the global metadata.

18. A computer program product comprising a non-transitory machine-readable medium storing instructions that, when executed by at least one programmable processor, cause the at least one programmable processor to perform operations comprising:
receiving, at a first optimizer, a command on a distributed database system including the first optimizer and a plurality of nodes;
generating, by the first optimizer, an execution plan for fulfilling the command, wherein the execution plan includes a task to be performed by a first node of the plurality of nodes, wherein the execution plan is generated based at least on global metadata cached at the first optimizer, and wherein the execution plan is generated optimistically without the first optimizer verifying that the global metadata cached at the first optimizer as having been synchronized with a global copy of a global metadata associated with the distributed database to include a most recent update to the global metadata associated with the distributed database system;
determining, by the first optimizer, that the first node is unable to successfully perform the task based on the execution plan generated using the global metadata cached at the first optimizer; and
in response to determining that the task is not successfully performed by the first node, updating the global metadata cached at the first optimizer by at least synchronizing the global metadata cached at the first optimizer with the global copy of the global metadata associated with the distributed database system.

* * * * *